(12) United States Patent
Guedalia et al.

(10) Patent No.: US 9,578,333 B2
(45) Date of Patent: Feb. 21, 2017

(54) METHOD FOR DECREASING THE BIT RATE NEEDED TO TRANSMIT VIDEOS OVER A NETWORK BY DROPPING VIDEO FRAMES

(71) Applicant: QUALCOMM Incorporated, San Diego, CA (US)

(72) Inventors: Isaac David Guedalia, Bet Shemesh (IL); Sarah Harris, Jerusalem (IL)

(73) Assignee: QUALCOMM Incorporated, San Diego, CA (US)

( * ) Notice: Subject to any disclaimer, the term of this patent is extended or adjusted under 35 U.S.C. 154(b) by 515 days.

(21) Appl. No.: 13/836,269

(22) Filed: Mar. 15, 2013

(65) Prior Publication Data
US 2014/0269938 A1 Sep. 18, 2014

(51) Int. Cl.
*H04N 19/115* (2014.01)
*H04N 21/2343* (2011.01)
(Continued)

(52) U.S. Cl.
CPC .......... *H04N 19/115* (2014.11); *H04N 19/142* (2014.11); *H04N 19/184* (2014.11);
(Continued)

(58) Field of Classification Search
CPC ............ H04N 21/234381; H04N 21/84; H04N 19/184; H04N 19/463; H04N 19/142; H04N 19/115
(Continued)

(56) References Cited

U.S. PATENT DOCUMENTS

| 6,907,073 B2 | 6/2005 | Sawhney et al. |
| 2002/0196372 A1* | 12/2002 | Ito .......................... G06T 17/00 348/700 |

(Continued)

FOREIGN PATENT DOCUMENTS

| EP | 0952709 A1 | 10/1999 |
| EP | 1058391 A1 | 12/2000 |

(Continued)

OTHER PUBLICATIONS

International Search Report and Written Opinion—PCT/US2014/028204—ISA/EPO—Aug. 6, 2014.
Taiwan Search Report—TW103109328—TIPO—Jan. 5, 2016.

*Primary Examiner* — Zhihan Zhou
(74) *Attorney, Agent, or Firm* — Muncy, Geissler, Olds & Lowe, P.C.

(57) ABSTRACT

An aspect of the disclosure is directed to transmitting a reduced stream of encoded video frames. An original stream of encoded video frames is analyzed, a plurality of frames are removed without re-encoding encoded video frames to generate the reduced stream of encoded video frames, and the reduced stream and metadata describing the plurality of removed frames are transmitted. An aspect of the disclosure is directed to creating a new version of an original stream of encoded video frames from a reduced stream of encoded video frames. The reduced stream of encoded video frames is received, the plurality of removed frames is identified based on metadata related to the reduced stream, a plurality of replacement frames are generated, and the plurality of replacement frames are added to the reduced stream of encoded video frames to recreate the new version of the original stream of encoded video frames.

28 Claims, 14 Drawing Sheets

(51) Int. Cl.
*H04N 21/84* (2011.01)
*H04N 19/463* (2014.01)
*H04N 19/142* (2014.01)
*H04N 19/184* (2014.01)

(52) U.S. Cl.
CPC ... *H04N 19/463* (2014.11); *H04N 21/234381* (2013.01); *H04N 21/84* (2013.01)

(58) Field of Classification Search
USPC .................................................. 375/240.26
See application file for complete search history.

(56) References Cited

U.S. PATENT DOCUMENTS

| | | | |
|---|---|---|---|
| 2003/0039308 A1* | 2/2003 | Wu | H04N 19/503 375/240.12 |
| 2003/0058932 A1* | 3/2003 | Challapali | 375/240.01 |
| 2005/0089232 A1* | 4/2005 | Hsu | H04N 19/172 382/236 |
| 2006/0026294 A1* | 2/2006 | Virdi | H04N 21/23406 709/232 |
| 2006/0165176 A1 | 7/2006 | Raveendran et al. | |
| 2006/0239563 A1* | 10/2006 | Chebil | G11B 20/10527 382/232 |
| 2007/0002946 A1* | 1/2007 | Bouton | H04N 19/15 375/240.01 |
| 2007/0014364 A1 | 1/2007 | Kue-hwan | |
| 2007/0058926 A1* | 3/2007 | Virdi | H04N 5/783 386/231 |
| 2007/0201500 A1 | 8/2007 | Deshpande | |
| 2007/0206672 A1* | 9/2007 | Yamashita | H04N 19/60 375/240.01 |
| 2007/0296854 A1* | 12/2007 | Berkey | H04N 19/172 348/412.1 |
| 2008/0130737 A1* | 6/2008 | Kamariotis et al. | 375/240.01 |
| 2009/0110304 A1* | 4/2009 | Chen et al. | 382/232 |
| 2009/0225853 A1 | 9/2009 | Oz | |
| 2009/0232202 A1 | 9/2009 | Chen et al. | |
| 2009/0316778 A1* | 12/2009 | Kim | H04N 19/159 375/240.01 |
| 2010/0027663 A1 | 2/2010 | Dai et al. | |
| 2010/0085489 A1* | 4/2010 | Hagemeier | H04N 21/23424 348/723 |
| 2010/0296579 A1* | 11/2010 | Panchal | H04N 19/172 375/240.15 |
| 2011/0032429 A1 | 2/2011 | Bing | |
| 2013/0058406 A1* | 3/2013 | Ye | H04N 19/159 375/240.12 |
| 2013/0064308 A1* | 3/2013 | Nemiroff | H04N 21/23439 375/240.28 |

FOREIGN PATENT DOCUMENTS

| | | |
|---|---|---|
| TW | 201220826 A | 5/2012 |
| WO | 2006067374 A1 | 6/2006 |
| WO | WO 2006067374 A1 * | 6/2006 |
| WO | 2011087963 A1 | 7/2011 |

\* cited by examiner

METHOD FOR DECREASING THE BIT RATE NEEDED TO TRANSMIT VIDEOS OVER A NETWORK BY DROPPING VIDEO FRAMES

BACKGROUND OF THE INVENTION

1. Field of the Invention

The disclosure is directed to decreasing the bit rate needed to transmit videos over a network by dropping video frames.

2. Description of the Related Art

Wireless communication systems have developed through various generations, including a first-generation analog wireless phone service (1G), a second-generation (2G) digital wireless phone service (including interim 2.5G and 2.75G networks) and third-generation (3G) and fourth-generation (4G) high speed data/Internet-capable wireless services. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

More recently, Long Term Evolution (LTE) has been developed as a wireless communications protocol for wireless communication of high-speed data for mobile phones and other data terminals. LTE is based on GSM, and includes contributions from various GSM-related protocols such as Enhanced Data rates for GSM Evolution (EDGE), and Universal Mobile Telecommunications System (UMTS) protocols such as High-Speed Packet Access (HSPA).

Due to the ever increasing amount of data being transmitted over data networks, such as 3G and 4G networks, carriers are struggling to meet user's data needs. This is exacerbated by the quantity of video streaming done over the network to mobile devices.

SUMMARY

Various aspects of the disclosure are directed to transmitting a reduced stream of encoded video frames. Various other aspects of the disclosure are directed to creating a new version of an original stream of encoded video frames from a reduced stream of encoded video frames.

A method of transmitting a reduced stream of encoded video frames includes analyzing a stream of encoded video frames, removing a plurality of frames from the stream of encoded video frames without re-encoding the encoded video frames to generate the reduced stream of encoded video frames, and transmitting the reduced stream of encoded video frames and metadata describing the plurality of removed frames.

A method of creating a new version of an original stream of encoded video frames from a reduced stream of encoded video frames includes receiving the reduced stream of encoded video frames, wherein the reduced stream of encoded video frames was created by removing a plurality of frames from the original stream of encoded video frames, identifying the plurality of removed frames based on metadata related to the reduced stream of encoded video frames, generating a plurality of replacement frames based on the identified plurality of removed frames, and adding the plurality of replacement frames to the reduced stream of encoded video frames to recreate the new version of the original stream of encoded video frames.

An apparatus for transmitting a reduced stream of encoded video frames includes logic configured to analyze a stream of encoded video frames, logic configured to remove a plurality of frames from the stream of encoded video frames without re-encoding the encoded video frames to generate the reduced stream of encoded video frames, and logic configured to transmit the reduced stream of encoded video frames and metadata describing the plurality of removed frames.

An apparatus for creating a new version of an original stream of encoded video frames from a reduced stream of encoded video frames includes logic configured to receive the reduced stream of encoded video frames, wherein the reduced stream of encoded video frames was created by removing a plurality of frames from the original stream of encoded video frames, logic configured to identify the plurality of removed frames based on metadata related to the reduced stream of encoded video frames, logic configured to generate a plurality of replacement frames based on the identified plurality of removed frames, and logic configured to add the plurality of replacement frames to the reduced stream of encoded video frames to recreate the new version of the original stream of encoded video frames.

An apparatus for transmitting a reduced stream of encoded video frames includes means for analyzing a stream of encoded video frames, means for removing a plurality of frames from the stream of encoded video frames without re-encoding the encoded video frames to generate the reduced stream of encoded video frames, and means for transmitting the reduced stream of encoded video frames and metadata describing the plurality of removed frames.

An apparatus for creating a new version of an original stream of encoded video frames from a reduced stream of encoded video frames includes means for receiving the reduced stream of encoded video frames, wherein the reduced stream of encoded video frames was created by removing a plurality of frames from the original stream of encoded video frames, means for identifying the plurality of removed frames based on metadata related to the reduced stream of encoded video frames, means for generating a plurality of replacement frames based on the identified plurality of removed frames, and means for adding the plurality of replacement frames to the reduced stream of encoded video frames to recreate the new version of the original stream of encoded video frames.

A non-transitory computer-readable medium for transmitting a reduced stream of encoded video frames includes at least one instruction to analyze a stream of encoded video frames, at least one instruction to remove a plurality of frames from the stream of encoded video frames without re-encoding the encoded video frames to generate the reduced stream of encoded video frames, and at least one instruction to transmit the reduced stream of encoded video frames and metadata describing the plurality of removed frames.

An non-transitory computer-readable medium for creating a new version of an original stream of encoded video frames from a reduced stream of encoded video frames includes at least one instruction to receive the reduced stream of encoded video frames, wherein the reduced stream of encoded video frames was created by removing a plurality of frames from the original stream of encoded video frames, at least one instruction to identify the plurality of removed frames based on metadata related to the reduced stream of encoded video frames, at least one instruction to generate a plurality of replacement frames based on the identified plurality of removed frames, and at least one instruction to add the plurality of replacement frames to the reduced stream of encoded video frames to recreate the new version of the original stream of encoded video frames.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which.

DETAILED DESCRIPTION

Figure 1:
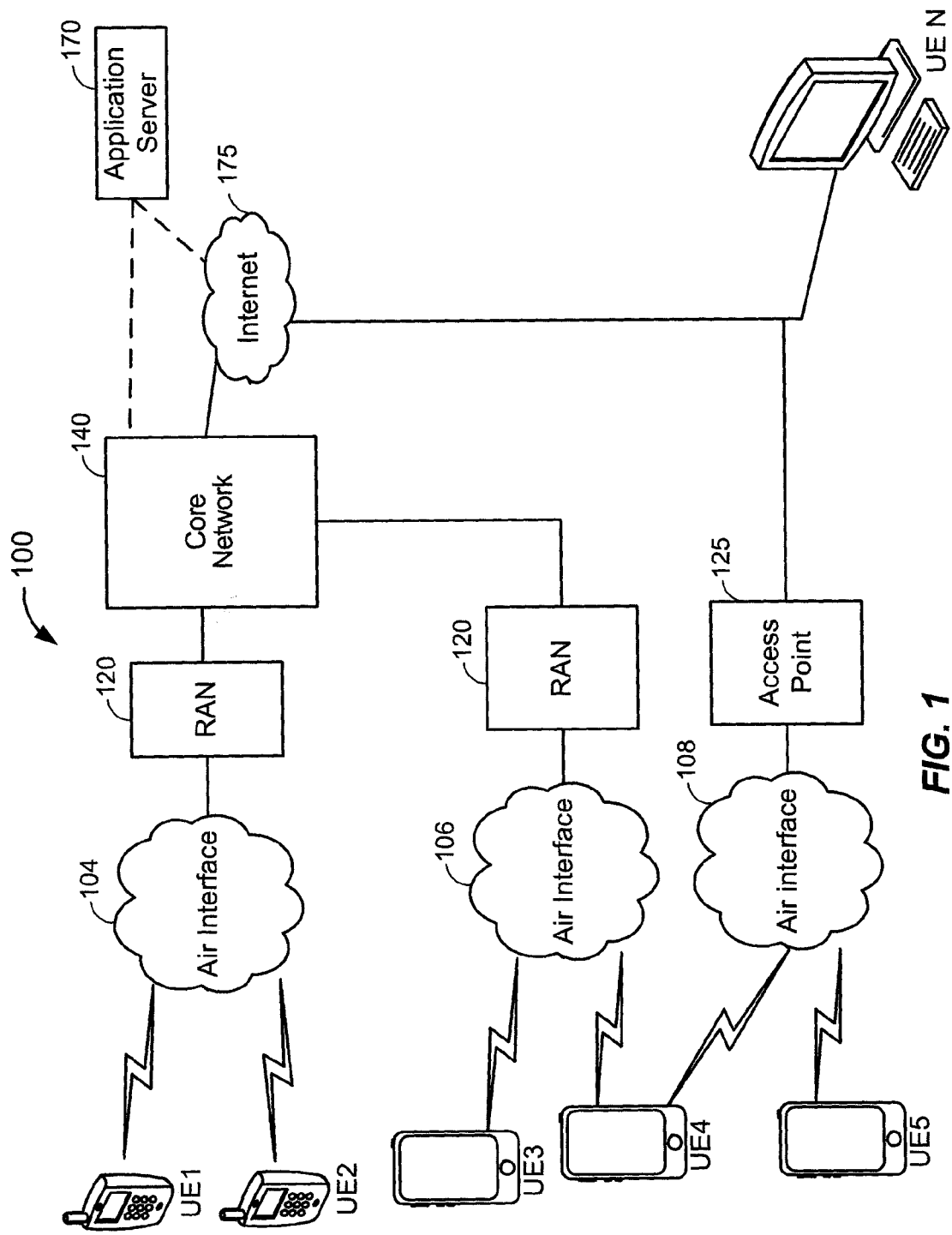
FIG. 1 illustrates a high-level system architecture of a wireless communications system in accordance with an aspect of the disclosure.

Various aspects are disclosed in the following description and related drawings. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

A client device, referred to herein as a user equipment (UE), may be mobile or stationary, and may communicate with a radio access network (RAN). As used herein, the term "UE" may be referred to interchangeably as an "access terminal" or "AT," a "wireless device," a "subscriber device," a "subscriber terminal," a "subscriber station," a "user terminal" or UT, a "mobile terminal," a "mobile station" and variations thereof. Generally, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a high-level system architecture of a wireless communications system 100 in accordance with an aspect of the disclosure. The wireless communications system 100 contains UEs 1 . . . N. The UEs 1 . . . N can include cellular telephones, personal digital assistant (PDAs), pagers, a laptop computer, a desktop computer, and so on. For example, in FIG. 1, UEs 1 . . . 2 are illustrated as cellular calling phones, UEs 3 . . . 5 are illustrated as cellular touchscreen phones or smart phones, and UE N is illustrated as a desktop computer or PC.

Referring to FIG. 1, UEs 1, . . . N are configured to communicate with an access network (e.g., the RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., Code Division Multiple Access (CDMA), Evolution-Data Optimized (EV-DO), Evolved High Rate Packet Data (eHRPD), Global System of Mobile Communication (GSM), Enhanced Data rates for GSM Evolution (EDGE), Wideband CDMA (W-CDMA), Long-Term Evolution (LTE), etc.), while the air interface 108 can comply with a wireless IP protocol (e.g., IEEE 802.11). The RAN 120 includes a plurality of access points that serve UEs over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 is configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an Ethernet connection of WiFi or 802.11-based network). The Internet. 175 can thereby function to bridge packet-switched data communications between UE N and UEs 1 . . . N via the core network 140. Also shown in FIG. 1 is the access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example. UE N is shown as a desktop computer with a wired connection to the Internet 175, such as a direct connection to a modem or router, which can correspond to the access point 125 itself in an example (e.g., for a WiFi router with both wired and wireless connectivity).

Referring to FIG. 1, an application server 170 is shown as connected to the Internet 175, the core network 140, or both. The application server 170 can be implemented as a plurality of structurally separate servers, or alternately may correspond to a single server. As will be described below in more detail, the application server 170 is configured to support one or more communication services (e.g., Voice-over-Internet Protocol (VoIP) sessions, Push-to-Talk (PTT) sessions, group communication sessions, social networking services, etc.) for UEs that can connect to the application server 170 via the core network 140 and/or the Internet 175.

Figure 2:
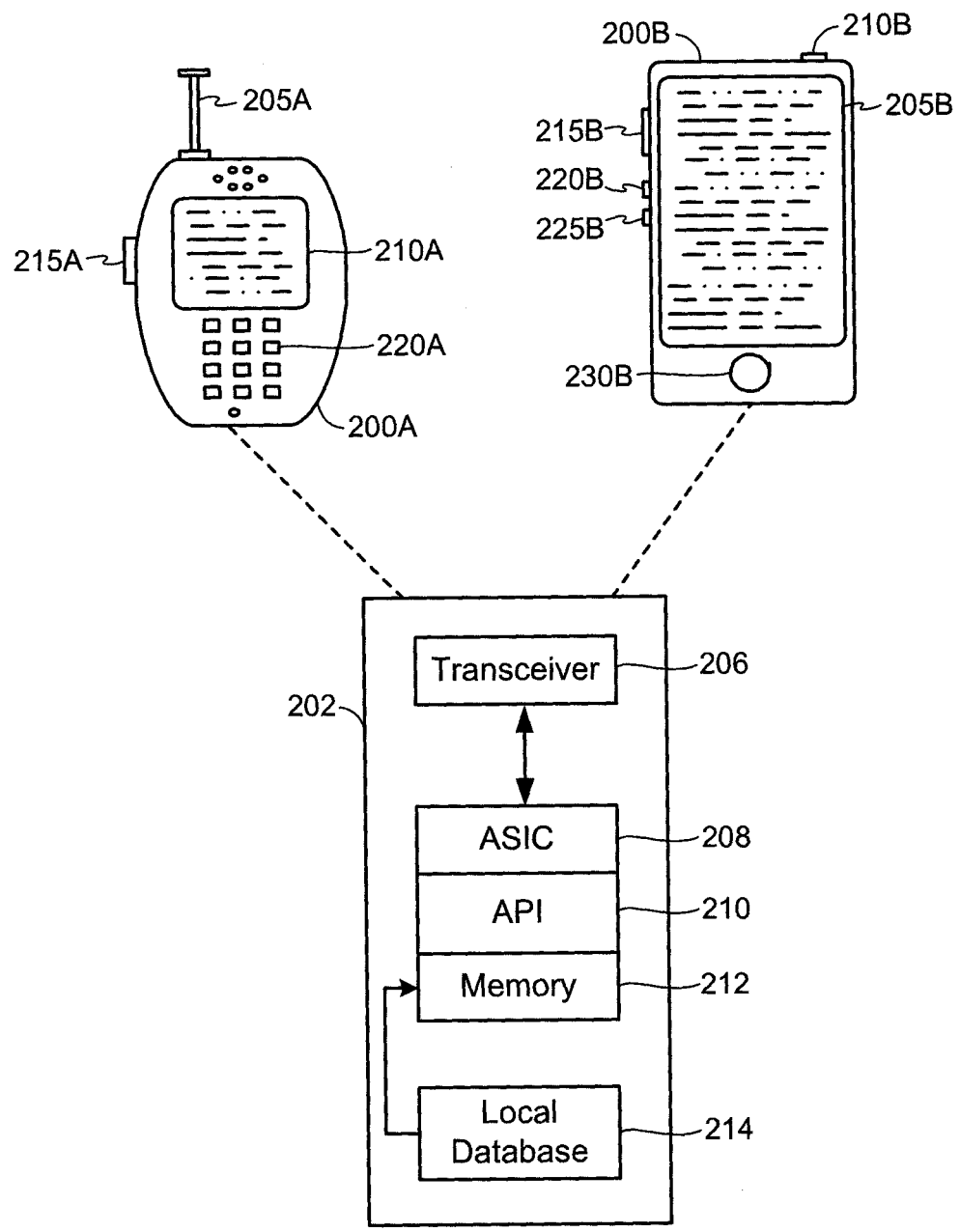
FIG. 2 illustrates examples of user equipments (UEs) in accordance with aspects of the disclosure.

FIG. 2 illustrates examples of UEs in accordance with aspects of the disclosure. Referring to FIG. 2, UE 200A is illustrated as a calling telephone and UE 200B is illustrated as a touchscreen device (e.g., a smart phone, a tablet computer, etc.). As shown in FIG. 2, an external casing of UE 200A is configured with an antenna 205A, display 210A, at least one button 215A (e.g., a PTT button, a power button, a volume control button, etc.) and a keypad 220A among other components, as is known in the art. Also, an external casing of UE 200B is configured with a touchscreen display 205B, peripheral buttons 210B, 215B, 220B and 225B (e.g., a power control button, a volume or vibrate control button, an airplane mode toggle button, etc.), at least one front-panel button 230B (e.g., a Home button, etc.), among other components, as is known in the art. While not shown explicitly as part of UE 200B, the UE 200B can include one or more external antennas and/or one or more integrated antennas that are built into the external casing of UE 200B, including but not limited to WiFi antennas, cellular antennas, satellite position system (SPS) antennas (e.g., global positioning system (GPS) antennas), and so on.

While internal components of UEs such as the UEs 200A and 200B can be embodied with different hardware configurations, a basic high-level UE configuration for internal hardware components is shown as platform 202 in FIG. 2. The platform 202 can receive and execute software applications, data and/or commands transmitted from the RAN 120 that may ultimately come from the core network 140, the Internet 175 and/or other remote servers and networks (e.g., application server 170, web URLs, etc.). The platform 202 can also independently execute locally stored applications without RAN interaction. The platform 202 can include a transceiver 206 operably coupled to an application specific integrated circuit (ASIC) 208, or other processor, microprocessor, logic circuit, or other data processing device. The ASIC 208 or other processor executes the application programming interface (API) 210 layer that interfaces with any resident programs in the memory 212 of the wireless device. The memory 212 can be comprised of read-only memory (ROM) or random-access memory (RAM), electrically erasable programmable ROM (EEPROM), flash cards, or any memory common to computer platforms. The platform 202 also can include a local database 214 that can store applications not actively used in memory 212, as well as other data. The local database 214 is typically a flash memory cell, but can be any secondary storage device as known in the art, such as magnetic media, EEPROM, optical media, tape, soft or hard disk, or the like.

Accordingly, an aspect of the disclosure can include a UE (e.g., UE 200A, 200B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the UEs 200A and 200B in FIG. 2 are to be considered merely illustrative and the disclosure is not limited to the illustrated features or arrangement.

The wireless communication between the UEs 200A and/or 200B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs from the RAN using a variety of networks and configurations. Accordingly, the illustrations provided herein are not intended to limit the aspects of the disclosure and are merely to aid in the description of various aspects of the disclosure.

Figure 3:
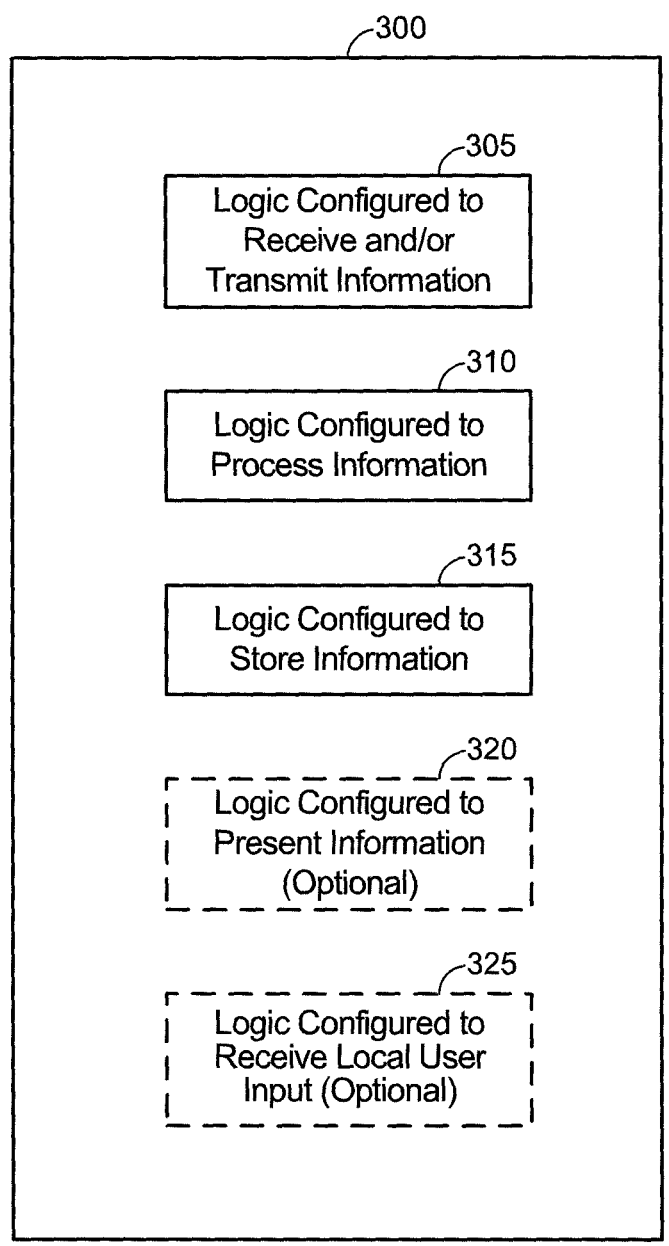
FIG. 3 illustrates a communication device that includes logic configured to perform functionality in accordance with an aspect of the disclosure.

FIG. 3 illustrates a communication device 300 that includes logic configured to perform functionality. The communication device 300 can correspond to any of the above-noted communication devices, including but not limited to UEs 200A or 200B, any component of the RAN 120, any component of the core network 140, any components coupled with the core network 140 and/or the Internet 175 (e.g., the application server 170), and so on. Thus, communication device 300 can correspond to any electronic device that is configured to communicate with (or facilitate communication with) one or more other entities over the wireless communications system 100 of FIG. 1.

Referring to FIG. 3, the communication device 300 includes logic configured to receive and/or transmit information 305. In an example, if the communication device 300 corresponds to a wireless communications device (e.g., UE 200A or 200B), the logic configured to receive and/or transmit information 305 can include a wireless communications interface (e.g., Bluetooth, WiFi, 2G, CDMA, W-CDMA, 3G, 4G, LTE, etc.) such as a wireless transceiver and associated hardware (e.g., an RF antenna, a MODEM, a modulator and/or demodulator, etc.). In another example, the logic configured to receive and/or transmit information 305 can correspond to a wired communications interface e.g., a serial connection, a USB or Firewire connection, an Ethernet connection through which the Internet 175 can be accessed, etc.). Thus, if the communication device 300 corresponds to some type of network-based server (e.g., the application 170), the logic configured to receive and/or transmit information 305 can correspond to an Ethernet card, in an example, that connects the network-based server to other communication entities via an Ethernet protocol. In a further example, the logic configured to receive and/or transmit information 305 can include sensory or measurement hardware by which the communication device 300 can monitor its local environment (e.g., an accelerometer, a temperature sensor, a light sensor, an antenna for monitoring local RF signals, etc.). The logic configured to receive and/or transmit information 305 can also include software that, when executed, permits the associated hardware of the logic configured to receive and/or transmit information 305 to perform its reception and/or transmission function(s). However, the logic configured to receive and/or transmit information 305 does not correspond to software alone, and the logic configured to receive and/or transmit information 305 relies at least in part upon hardware to achieve its functionality.

Referring to FIG. 3, the communication device 300 further includes logic configured to process information 310. In an example, the logic configured to process information 310 can include at least a processor. Example implementations of the type of processing that can be performed by the logic configured to process information 310 includes but is not limited to performing determinations, establishing connections, making selections between different information options, performing evaluations related to data, interacting with sensors coupled to the communication device 300 to perform measurement operations, converting information from one format to another (e.g., between different protocols such as .wmv to .avi, etc.), and so on. For example, the processor included in the logic configured to process information 310 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine A processor may also be implemented as a combination of computing devices, e.g., a combination of a DSP and a microprocessor, a plurality of microprocessors, one or more microprocessors in conjunction with a DSP core, or any other such configuration. The logic configured to process information 310 can also include software that, when executed, permits the associated hardware of the logic configured to process information 310 to perform its processing function(s). However, the logic configured to process information 310 does not correspond to software alone, and the logic configured to process information 310 relies at least in part upon hardware to achieve its functionality.

Referring to FIG. 3, the communication device 300 further includes logic configured to store information 315. In an example, the logic configured to store information 315 can include at least a non-transitory memory and associated hardware (e.g., a memory controller, etc.). For example, the non-transitory memory included in the logic configured to store information 315 can correspond to RAM, flash memory, ROM, erasable programmable ROM (EPROM), EEPROM, registers, hard disk, a removable disk, a CD-ROM, or any other form of storage medium known in the art. The logic configured to store information 315 can also include software that, when executed, permits the associated hardware of the logic configured to store information 315 to perform its storage function(s). However, the logic configured to store information 315 does not correspond to software alone, and the logic configured to store information 315 relies at least in part upon hardware to achieve its functionality.

Referring to FIG. 3, the communication device 300 further optionally includes logic configured to present information 320. In an example, the logic configured to present information 320 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 300. For example, if the communication device 300 corresponds to UE 200A or UE 200B as shown in FIG. 2, the logic configured to present information 320 can include the display 210A of LIE 200A or the touchscreen display 205B of UE 200B. In a further example, the logic configured to present information 320 can be omitted for certain communication devices, such as network communication devices that do not have a local user (e.g., network switches or routers, remote servers, etc.). The logic configured to present information 320 can also include software that, when executed, permits the associated hardware of the logic configured to present information 320 to perform its presentation function(s). However, the logic configured to present information 320 does not correspond to software alone, and the logic configured to present information 320 relies at least in part upon hardware to achieve its functionality.

Referring to FIG. 3, the communication device 300 further optionally includes logic configured to receive local user input 325. In an example, the logic configured to receive local user input 325 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 300. For example, if the communication device 300 corresponds to UE 200A or UE 200B as shown in FIG. 2, the logic configured to receive local user input 325 can include the keypad 220A, any of the buttons 215A or 210B through 225B, the touchscreen display 205B, etc. hi a further example, the logic configured to receive local user input 325 can be omitted for certain communication devices, such as network communication devices that do not have a local user (e.g., network switches or routers, remote servers, etc.). The logic configured to receive local user input 325 can also include software that, when executed, permits the associated hardware of the logic configured to receive local user input 325 to perform its input reception function(s). However, the logic configured to receive local user input 325 does not correspond to software alone, and the logic configured to receive local user input 325 relies at least in part upon hardware to achieve its functionality.

Referring to FIG. 3, while the configured logics of 305 through 325 are shown as separate or distinct blocks in FIG. 3, it will be appreciated that the hardware and/or software by which the respective configured logic performs its functionality can overlap in part. For example, any software used to facilitate the functionality of the configured logics of 305 through 325 can be stored in the non-transitory memory associated with the logic configured to store information 315, such that the configured logics of 305 through 325 each performs their functionality (i.e., in this case, software execution) based in part upon the operation of software stored by the logic configured to store information 315. Likewise, hardware that is directly associated with one of the configured logics can be borrowed or used by other configured logics from time to time. For example, the processor of the logic configured to process information 310 can format data into an appropriate format before being transmitted by the logic configured to receive and/or transmit information 305, such that the logic configured to receive and/or transmit information 305 performs its functionality (i.e., in this case, transmission of data) based in part upon the operation of hardware (i.e., the processor) associated with the logic configured to process information 310.

Generally, unless stated otherwise explicitly, the phrase "logic configured to" as used throughout this disclosure is intended to invoke an aspect that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the aspects described below in more detail.

Figure 4:
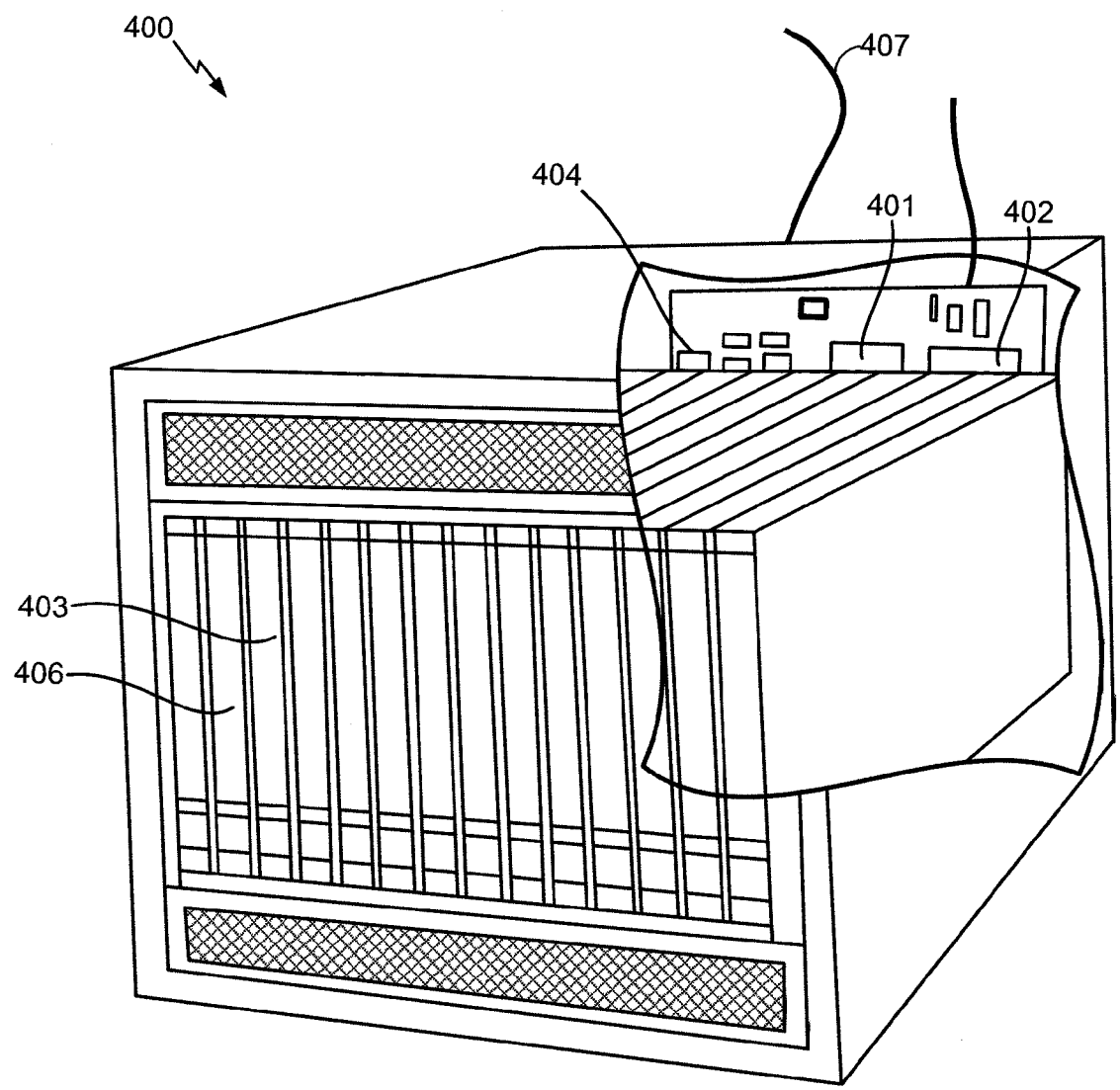
FIG. 4 illustrates an exemplary server according to various aspects of the disclosure.

The various embodiments may be implemented on any of a variety of commercially available server devices, such as server 400 illustrated in FIG. 4. In an example, the server 400 may correspond to one example configuration of the application server 170 described above. In FIG. 4, the server 400 includes a processor 401 coupled to volatile memory 402 and a large capacity nonvolatile memory, such as a disk drive 403. The server 400 may also include a floppy disc drive, compact disc (CD) or DVD disc drive 406 coupled to the processor 401. The server 400 may also include network access ports 404 coupled to the processor 401 for establishing data connections with a network 407, such as a local area network coupled to other broadcast system computers and servers or to the Internet. In context with FIG. 3, it will be appreciated that the server 400 of FIG. 4 illustrates one example implementation of the communication device 300, whereby the logic configured to transmit and/or receive information 305 corresponds to the network access points 404 used by the server 400 to communicate with the network 407, the logic configured to process information 310 corresponds to the processor 401, and the logic configuration to store information 315 corresponds to any combination of the volatile memory 402, the disk drive 403 and/or the disc drive 406. The optional logic configured to present information 320 and the optional logic configured to receive local user input 325 are not shown explicitly in FIG. 4 and may or may not be included therein. Thus, FIG. 4 helps to demonstrate that the communication device 300 may be implemented as a server, in addition to a UE implementation as in 205A or 205B as in FIG. 2.

Due to the ever increasing amount of data being transmitted over data networks, such as 3G and 4G networks, carriers are struggling to meet user's data needs. This is exacerbated by the quantity of video streaming done over the network to mobile devices.

Figure 5:
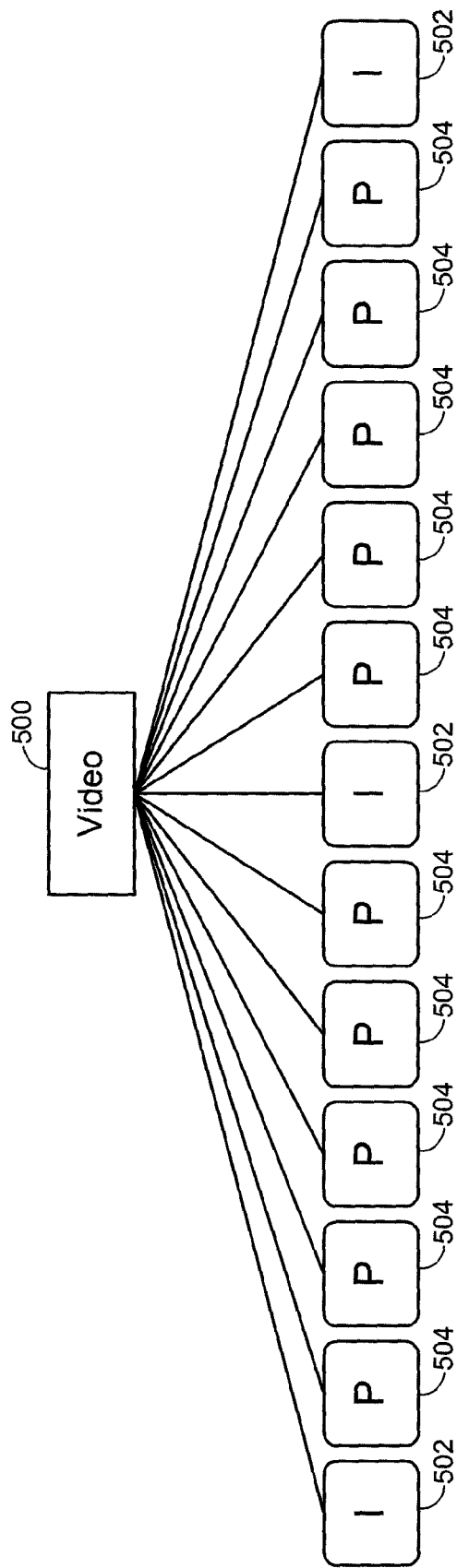
FIG. 5 illustrates an exemplary video file broken down into I frames and P frames.

Because a video is composed of many frames (still pictures), video files tend to be large. Video compression algorithms, used to reduce the size of a video file, typically classify frames as I frames, P frames, and B frames. An "I" frame (an "intra-coded picture") is a fully specified image that requires no decoding. A "P" frame (a "predicted picture") holds only the changes in the image from the previous frame and requires decoding in context of the preceding frame. P frames are also referred to as delta frames. A "B" frame can use both previous and forward frames for data reference to get the highest amount of data compression. FIG. 5 illustrates an exemplary video 500 broken down into I frames 502 and P frames 504.

The size of a video file can be reduced on a server by implementing a form of video degradation that drops certain frames. The dropped frames can be either "I" frames, "P" frames, or "B" frames. The degraded video is sent to a. UE, along with metadata describing the degradation performed. The original video is reproduced on the UE by filling in the missing frames using "morphing." Morphing is a technique by which multiple frames can be regenerated based on key differences between two more widely spaced frames. This provides several advantages, such as less data being sent over the network, very limited processing on the server side, and less buffering time on the client side.

Alternatively, frames can be replaced using computer vision for motion tracking. In that case, items in a frame can be tracked and moved in the frame accordingly.

Figure 6:
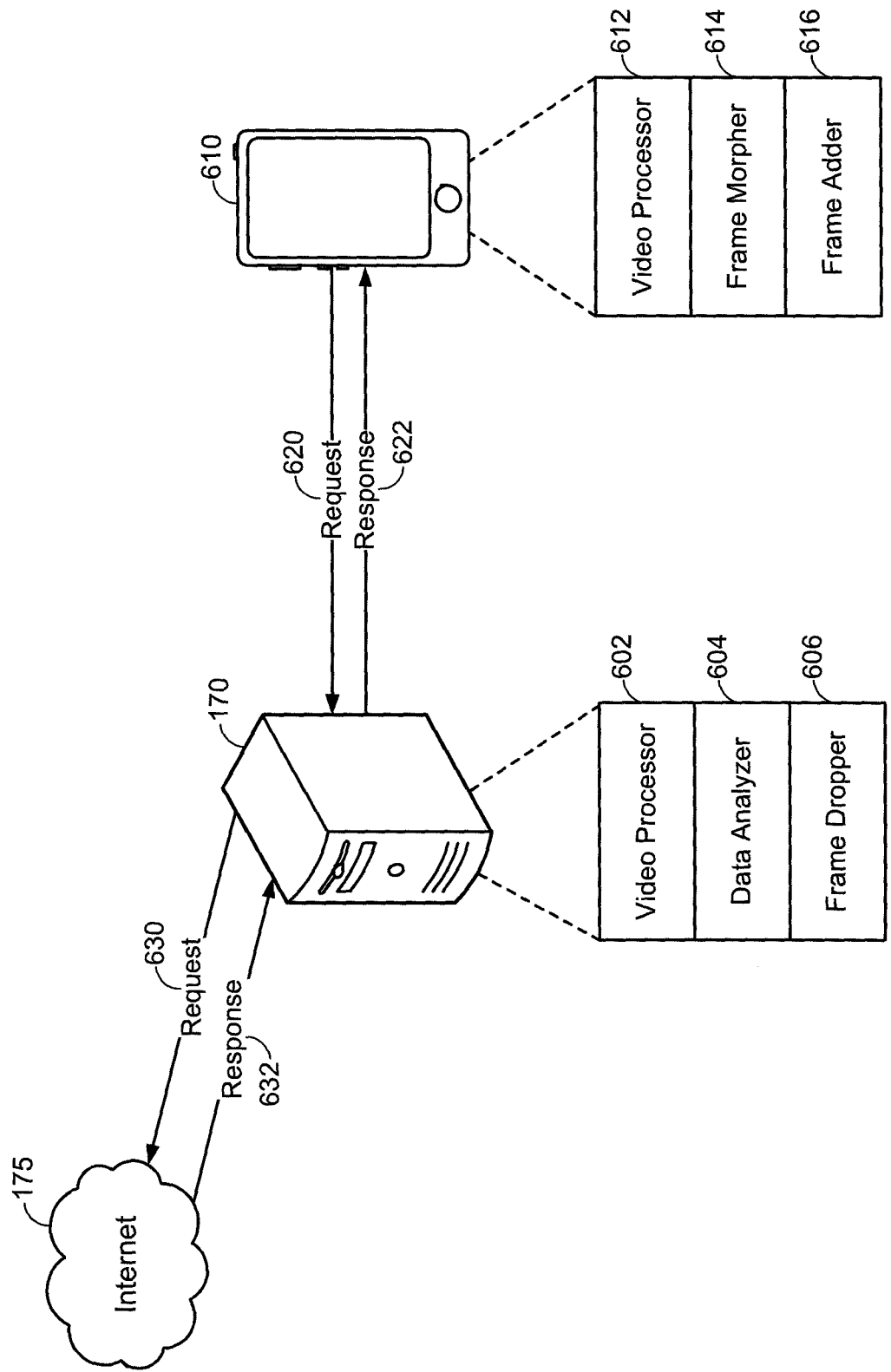
FIG. 6 illustrates high-level system architecture of a wireless communications system in accordance with an aspect of the disclosure.

FIG. 6 illustrates high-level system architecture of a wireless communications system in accordance with an aspect of the disclosure. A server, such as application server 170, includes a video processor 602, a data analyzer 604, and a frame dropper 606. A UE 610 includes a video processor 612, a frame morpher 614, and a frame adder 616. The UE 610 is illustrated as a smart phone, however, UE 610 may be any user equipment, including, but not limited to, a basic cell phone, a PDA, a tablet computer, a laptop computer, a desktop computer, or the like.

The UE 610 sends a request 620 for a video to the application server 170. If the video is not stored on the application server 170, the application server 170 sends a request 630 for the video over the Internet 175, or other similar network, to the remote server storing the video. The remote server (not shown) sends a response 632 including the video to the application server 170. The video file may be compressed into I and P frames by the remote server or the application server 170. The application server 170 processes the received video using the video processor 602, the data analyzer 604, and the frame dropper 606, as described below. The application server 170 sends a response 622 including the processed video to the UE 610. The UE 610 processes the received video using the video processor 612, the frame morpher 614, and the frame adder 616, as described below.

Figure 7:
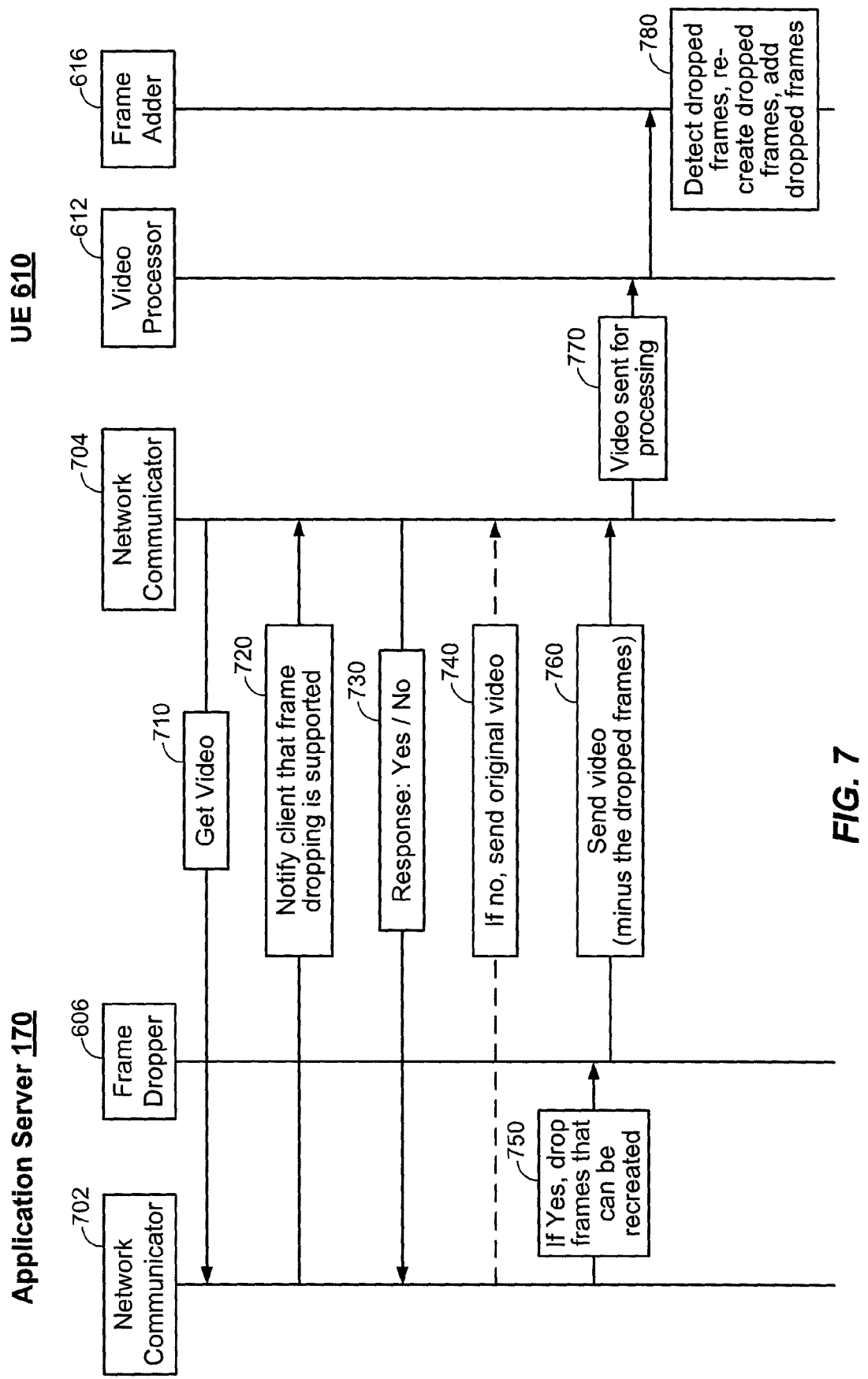
FIG. 7 illustrates an exemplary signaling diagram for processing a video file in the wireless communications system illustrated in FIG. 6.

FIG. 7 illustrates an exemplary signaling diagram for processing a video file in the wireless communications system 600 illustrated in FIG. 6. In addition to the components illustrated in FIG. 6, the application server 170 and the UE 610 each include a network communicator 702 and 704, respectively. The network communicators 702 and 704 provide communication interfaces that permit the application server 170 and the UE 610 to communicate with other devices on the network.

At 710, the UE 610 sends a request to the application server 170 to get a video. At 720, the application server 170 sends a notification to the UE 610 that it supports frame dropping. At 730, the UE 610 sends a "yes" or "no" response, indicating whether or not it supports the frame recreation. At 740, if the UE 610 does not support frame recreation, then the application server 170 sends the original video file. If, however, the UE 610 does support frame recreation, then at 750, the frame dropper 606 drops frames that can be recreated at the UE 610. At 760, the application server 170 sends the video, minus the dropped frames, to the UE 610. At 770, the UE 610 receives the video and passes it to the video processor 612. At 780, the frame adder 616 detects the dropped frames, recreates the dropped frames, and adds the recreated frames back into the received video file to recreate the original video file.

Although the signaling diagram of FIG. 7 is illustrated as being performed by the application server 170 and the UE 610, it may be performed by any server and client devices. As such, a server device may include a UE transmitting a video to another device, and the client device may include a server receiving a processed video from another device.

Figure 8:
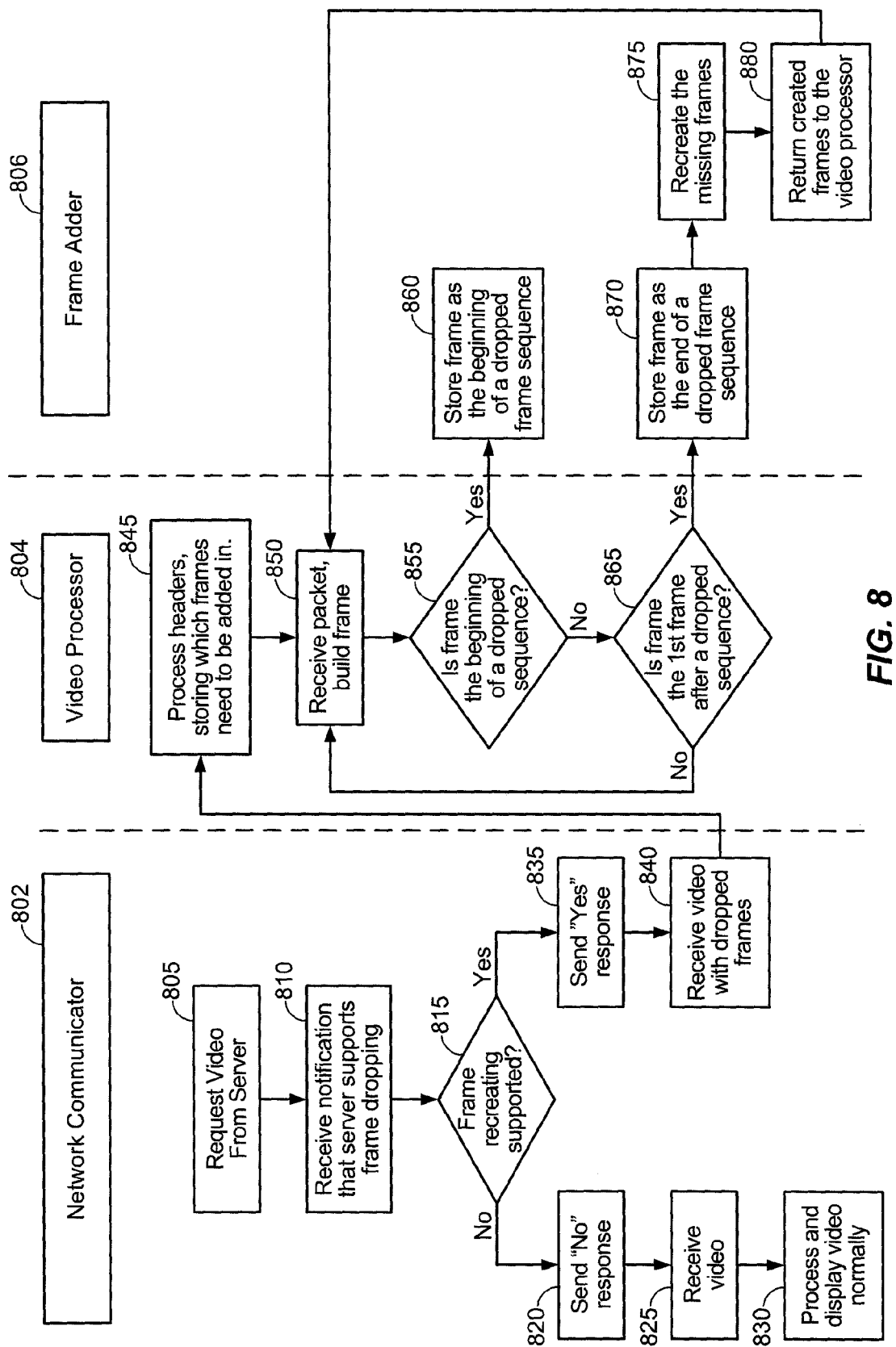
FIG. 8 illustrates a more detailed flow of the features performed at a client device.

FIG. 8 illustrates a more detailed flow of the features performed at a client device, such as UE 610. At 805, the client, via a network communicator 802, such as network communicator 704, requests a video from a server, such as application server 170. At 810, the client receives a notification from the server that the server supports frame dropping. At 815, the client determines whether or not it too supports recreating dropped frames. If it does not, then at 820, the client sends a "no" response to the server. At 825, the client receives the original, or un-processed, video. At 830, the client processes and displays the video normally.

If, however, at 815, the client determines that it does support recreating dropped frames, then at 835, the client sends a "yes" response to the server. At 840, the client receives the video from the server with certain frames dropped.

At 845, the client, via a video processor 804, such as video processor 612, processes the headers and stores information about which frames need to be added back into the video file. At 850, the client receives a packet of video data and builds a frame. At 855, the client determines whether or not the frame is the beginning of a dropped sequence of frames. This may be indicated in metadata received with the video file that identifies or describes the dropped frames. If the frame is the beginning of a sequence, then at 860, the client, via a frame adder 806, such as frame adder 616, stores the frame as the beginning of a dropped frame sequence.

If, however, the client determines that the frame is not the beginning of a dropped frame sequence, then at 865, the client determines whether or not the frame is the first frame after a dropped sequence. If it is not, then the flow returns to 850. If it is, then at 870, the client, via the frame adder 806, stores the frame as the end of a dropped frame sequence. At 875, the frame adder 806 recreates the missing frames using the frame at the beginning of the dropped frame sequence stored at 860 and the first frame after the dropped frame sequence stored at 870. The frame adder 806 recreates the frames by morphing the frame at the beginning of the dropped frame sequence into the first frame after the dropped frame sequence. At 880, the frame adder 806 returns the created frames to the video processor 804.

Figure 9:
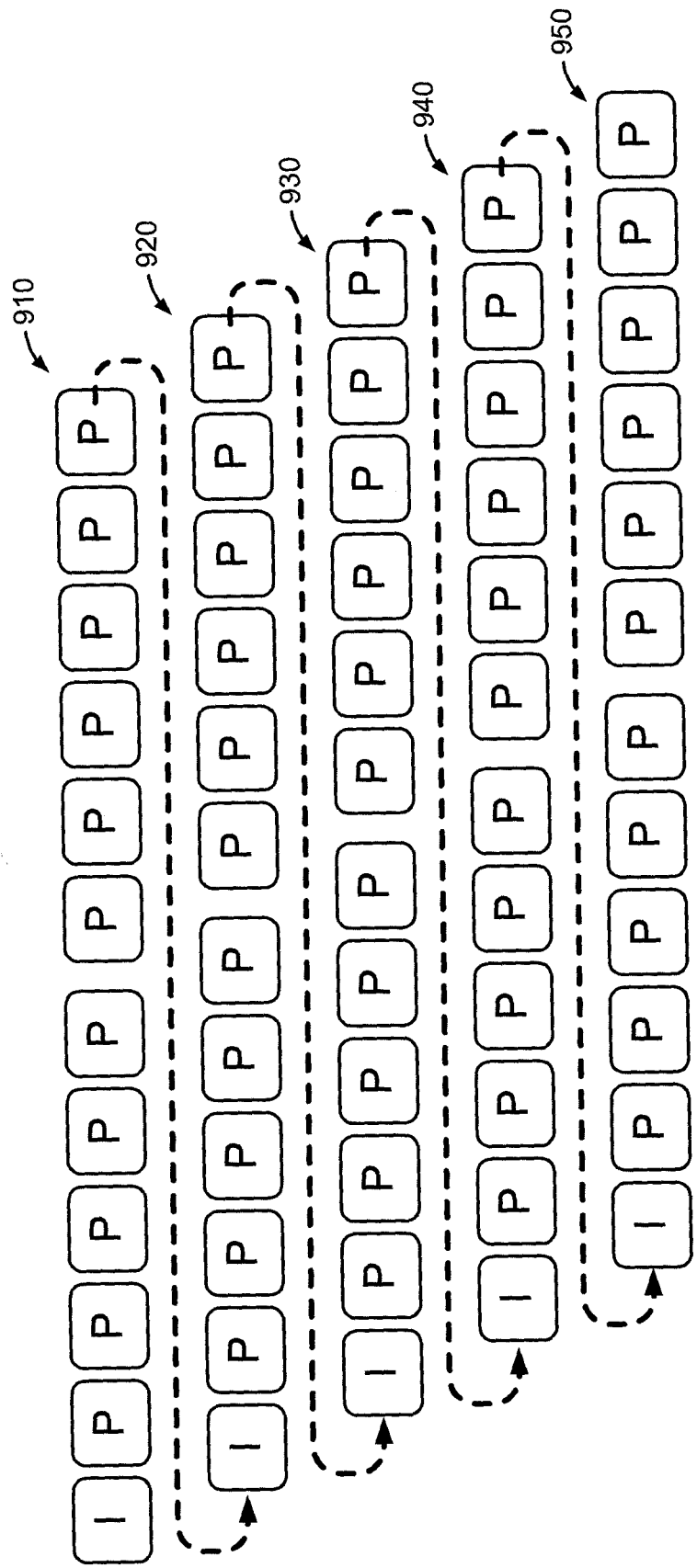
FIG. 9 illustrates a series of full groups of frames.

FIG. 9 illustrates a series of full groups of frames 910-950. In the example of FIG. 9, each group of frames 910-950 includes an I frame followed by a series of 11 P frames. The I frame at the beginning of each group of frames 910-950 can be treated as the last frame of the previous group of frames.

Figure 10:
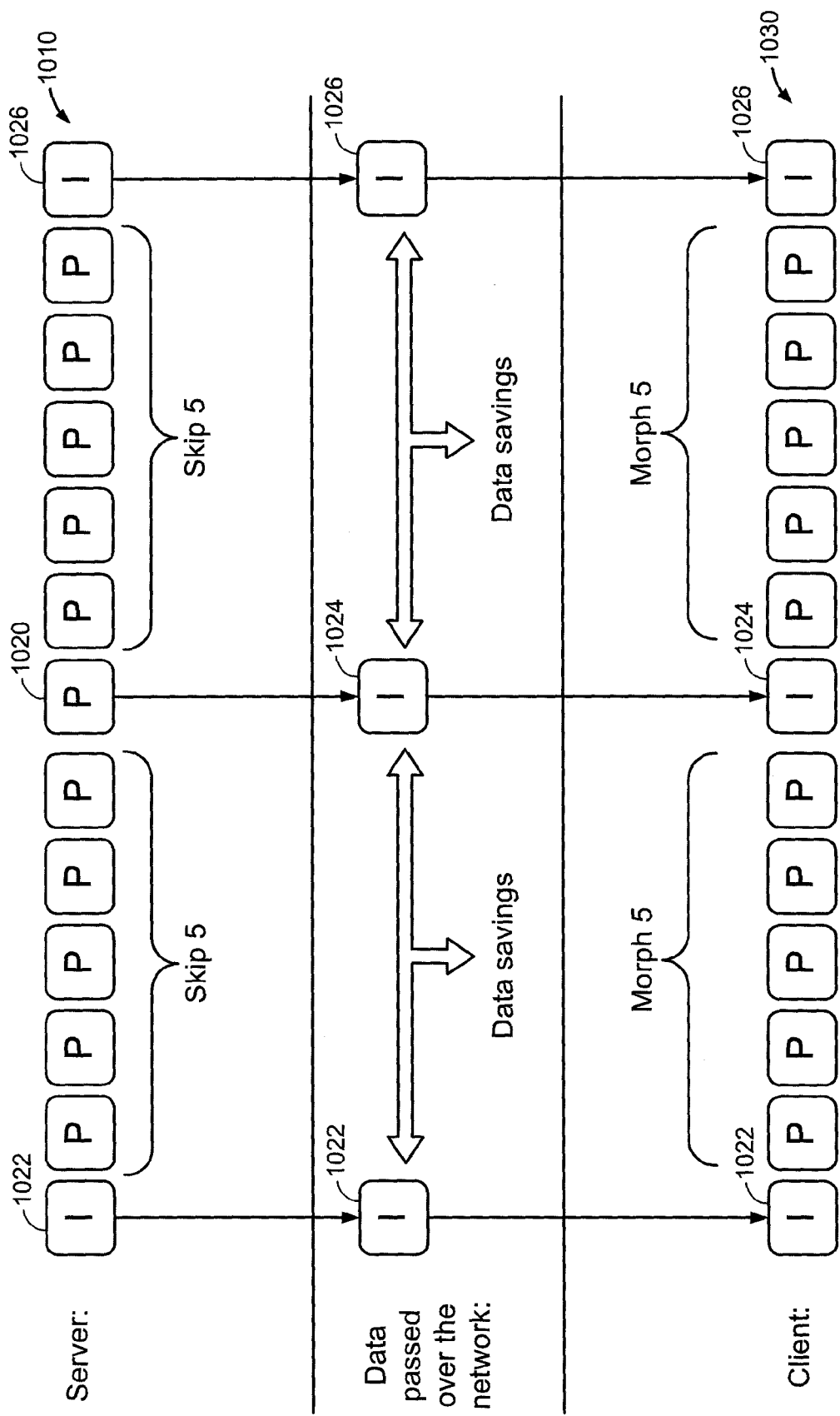
FIG. 10 illustrates an example of skipping and morphing five P frames at a time.

FIG. 10 illustrates an example of skipping and morphing five P frames at a time. For a sequence of frames 1010 comprising an I frame 1022 followed by 11 P frames and another I frame 1026, a server, such as application server 170, can skip every five P frames and convert the sixth P frame 1020 into an I frame 1024. The server then transmits only I frames 1022, 1024, and 1026 over the network. The two groups of five dropped frames represent the data savings of this algorithm. That is, instead of transmitting 13 frames, the server only transmits three frames.

The client receives the I frames 1022, 1024, and 1026 and uses them to recreate the 10 dropped P frames. The client creates the first group of five dropped P frames by morphing the I frame 1022 into the I frame 1024. The client creates the second group of five dropped P frames by morphing the I frame 1024 into the I frame 1026. The resulting sequence of frames 1030 is now a 13-frame sequence, just as the original sequence of frames 1010 was a 13-frame sequence.

Figure 11:
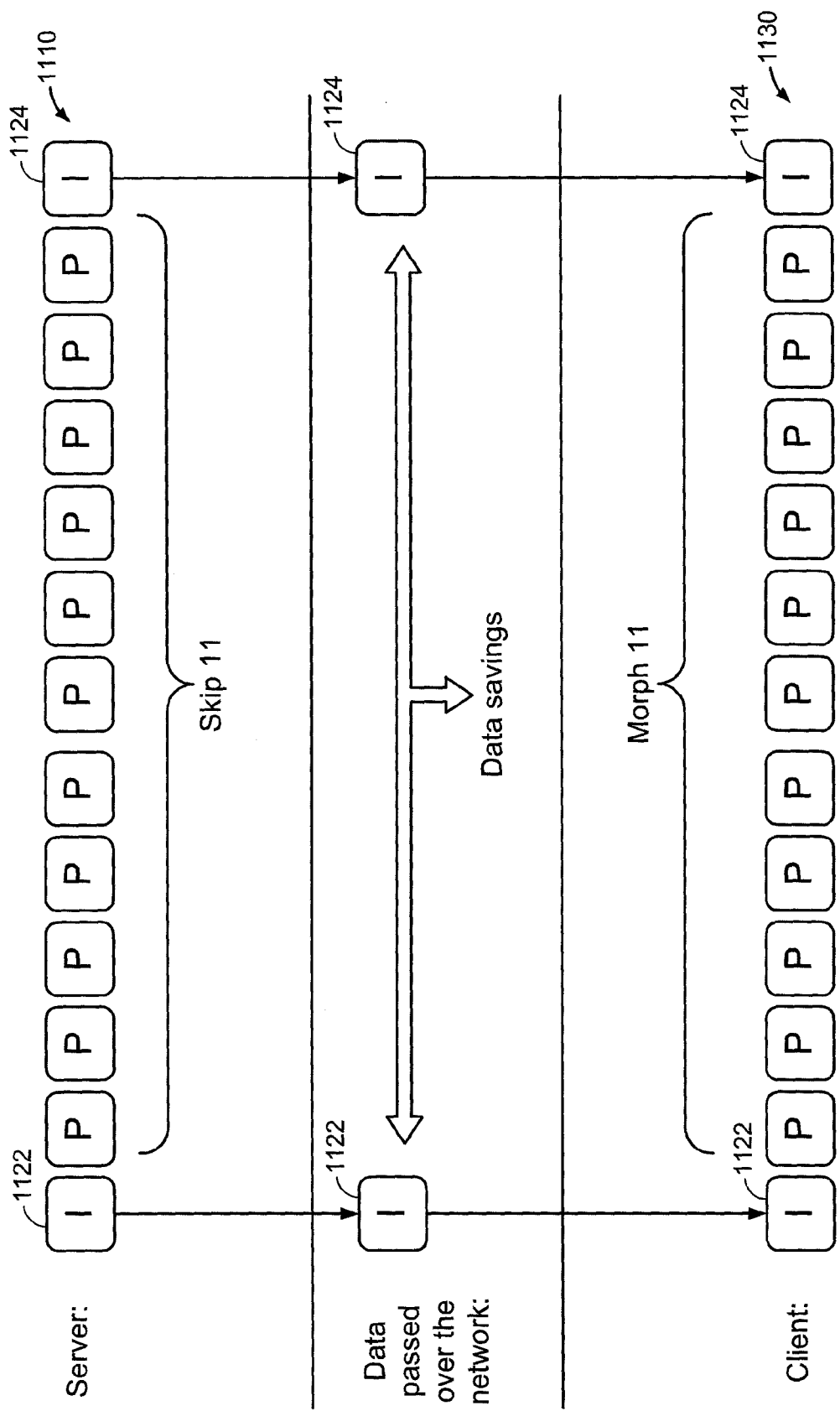
FIG. 11 illustrates an example of skipping and morphing 11 P frames at a time.

FIG. 11 illustrates an example of skipping and morphing 11 P frames at a time. For a sequence of frames 1110 comprising an I frame 1122 followed by 11 P frames and another I frame 1124, a server, such as application server 170, can skip every 11 P frames. The server then transmits only I frames 1122 and 1124 over the network. The 11 dropped frames represent the data savings of this algorithm. That is, instead of transmitting 13 frames, the server only transmits two frames.

The client receives the I frames 1122 and 1124 and uses them to recreate the 11 dropped P frames. The client creates the 11 dropped P frames by morphing the I frame 1122 into the I frame 1124. The resulting sequence of frames 1130 is now a 13 frame sequence, the same as the original sequence of frames 1110.

Table 1 illustrates an example of the frames the client could add based on the number of frames the server drops.

TABLE 1

| Server Video Processor Frame Sequences to Drop | Client Video Processor Morph in the Missing Frames |
|---|---|
| A partial set of P frames | The same number of frames skipped |
| One complete set of P frames | Twice the number of frames skipped |
| A complete P-I-P sequence | Three times the number of frames skipped |

Table 2 illustrates an example of the frames the client could add based on the number of frames the server drops.

TABLE 2

| Server Video Processor | Client Video Processor Morph in a Number of Frames | | |
|---|---|---|---|
| Frame Sequences to Drop | Same | 2x | 3x |
| A partial set of P frames: 5 | 5 | 10 | 15 |
| One complete set of P frames: 11 | 11 | 22 | 33 |
| A complete P-I-P sequence: 23 | 23 | 46 | 69 |

Figure 12:
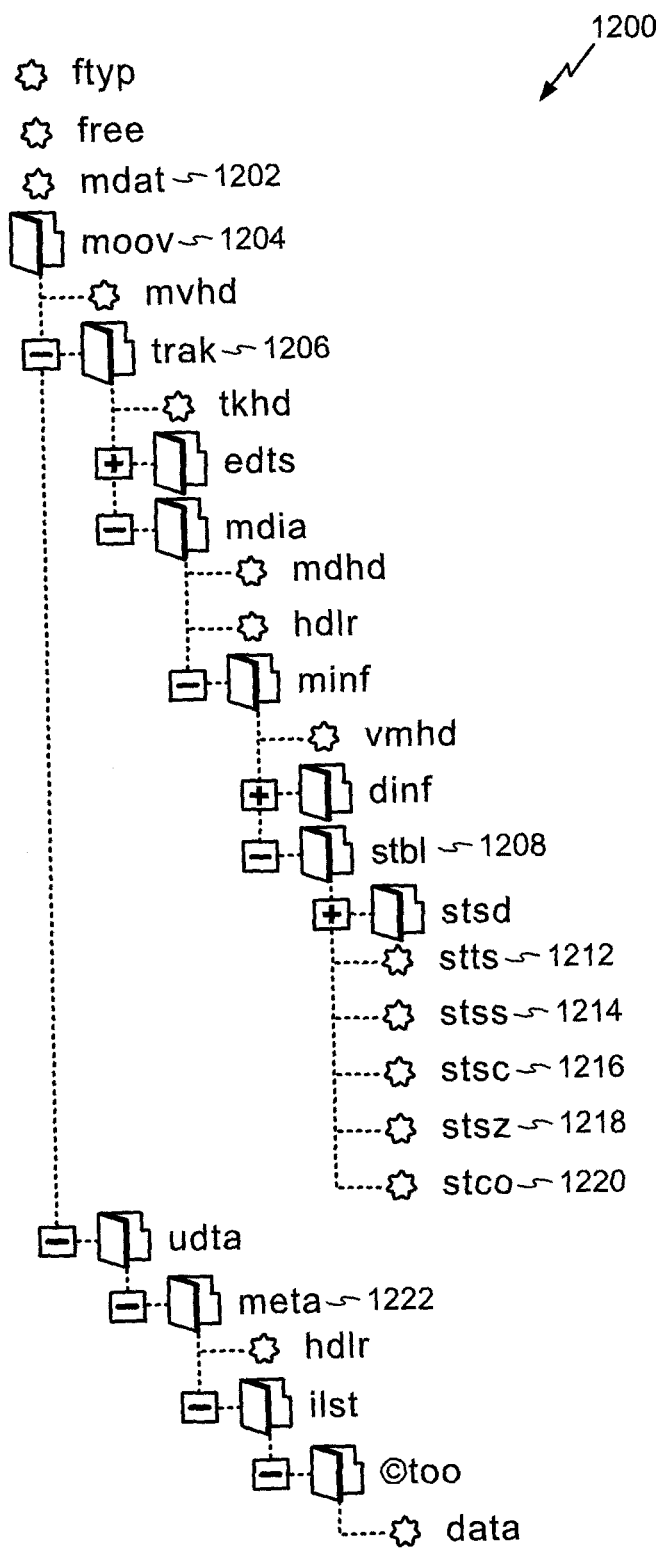
FIG. 12 illustrates an exemplary MP4 file hierarchy.

The following is a specific example of the frame dropping algorithm for the MP4 video format. FIG. 12 illustrates an exemplary MP4 file hierarchy 1200. MP4 files are composed of atoms. Each atom contains data necessary to decode the video. The "mdat" atom 1202 contains the actual video data (frames). The "stbl" atom 1208 contains various headers necessary for the decoding. The "stts" header 1212 includes the number of samples, the "stss" 1214 header includes the I frames identified by their number in the sequence, the "stsc" header 1216 includes the number of samples in each chunk, the "stsz" header 1218 includes the size of each frame, and the "stco" header 1220 includes number of chunks and their offsets.

The server can drop frames in an MP4 video file by retrieving the mdat atom 1202, looping through it frame by frame, deleting P frames, and updating the stts, stss, stsc, stsz, and stco headers 1212-1220. The server can identify P frames by identifying I frames from the stss header 1214. That is, the server knows which frames are I frames from the stss header 1214, meaning that any frame not listed in the stss header 1214 is a P frame, or at least is not an I frame.

On the client side, a modified data atom under the moov atom 1204 contains a flag indicating whether or not the video stream has been edited, and thus needs to be morphed, and a secondary field indicating the new size of the mdat atom 1202. For each trak 1206, the meta atom 1222 indicates the remaining frames, identified by their frame number. This information can also be used to determine the number of frames to morph in between the frames that were kept. Also for each trak 1206, a new stco header 1220 includes an offset table for the data if it has been edited to be morphed.

Alternatively, the headers might contain special fields dedicated to the option of dropping and morphing headers. In this case, each of the individual headers would not need to be edited; only the flag indicating whether or not the frames had been dropped would need to be edited. If any frames have been dropped, the flag is set and the client can refer to the dedicated headers in order to know how to put the video back together.

The following is a list of dedicated headers that might be added a dedicated mdat field, with the size of the data that remains, as well as dedicated stts, stss, stsc, stsz, and stco headers. Another added header might be the number of frames to morph in between the frames that were kept.

To put the video back together, the client checks whether or not the flag is set. For the video data, the client reads the frames sequentially using the morphed stco header 1220 or the dedicated header(s). The client finds the first frame and reads the frame size count bytes, using the size from the atom header or the size table. The client then reads until the next frame. The client reads in the next frame's size count bytes, using the size from the atom header or the size table, as with the previous frame. The client then determines if it needs to morph in missing frames based on the meta atom 1222 or the new stco header 1220 that includes the offsets table. If the client determines that it needs to morph in missing frames, then it morphs in the number of missing frames. If, however, the client determines that it does not need to morph in missing frames, then it plays the frame normally. The client then repeats the process until the final frame.

To deal with the video's audio, the audio for a sequence of frames, such as frame sequences 910-950, can be considered as part of the first frame. The audio can then be played at a slower rate than the frame is played. This would use a new table indicating the size of each frame as the sum of the first frame plus the audio of all dropped frames.

Figure 13:
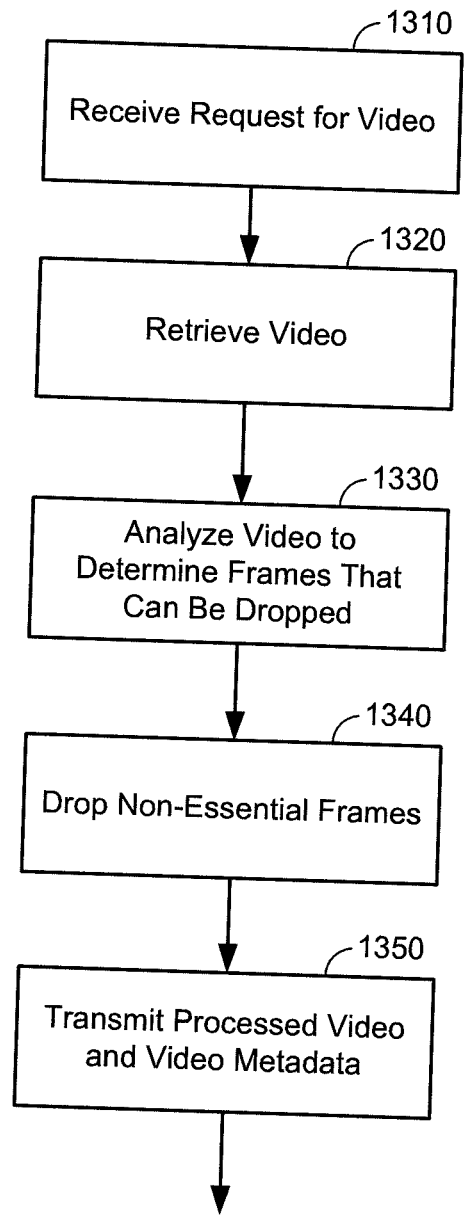
FIG. 13 illustrates an exemplary flow for processing a video file at a server.

FIG. 13 illustrates an exemplary flow for processing a video file at a server, such as the application server 170 illustrated in FIG. 6. At 1310, the server receives a request for a video from a client, such as UE 610. The video may be stored at the server or a remote server. At 1320, the server retrieves the video and sends it to a video processor, such as the video processor 602 illustrated in FIG. 6. At 1330, a data analyzer, such as the data analyzer 604 illustrated in FIG. 6, analyzes the video to determine which and/or how many frames can optimally be dropped from the video. At 1340, a frame dropper, such as the frame dropper 606 illustrated in FIG. 6, drops the frames the data analyzer determined to be non-essential. At 1350, the server transmits the remaining frames to the client, along with metadata describing the frames that have been dropped. The server may stream the video file to the client or send it as a discrete download.

Figure 14:
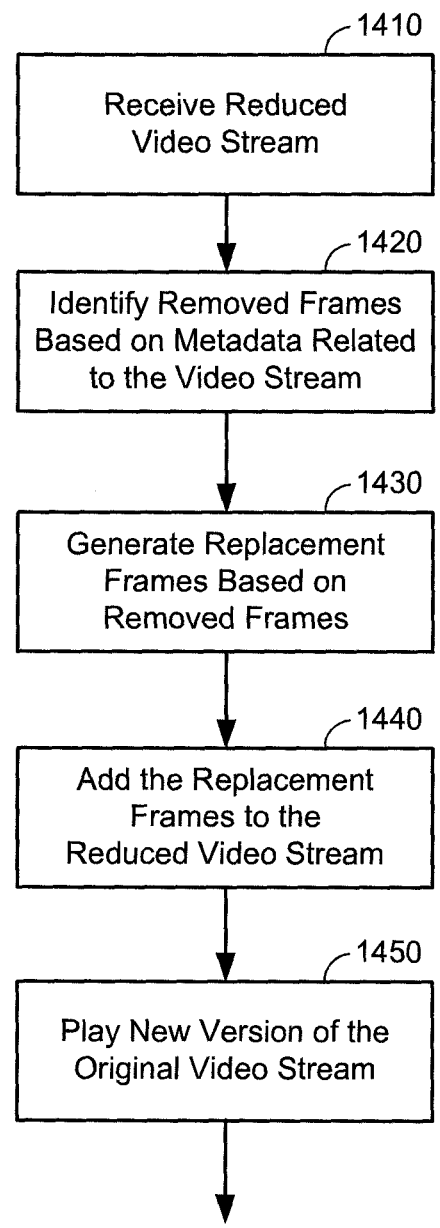
FIG. 14 illustrates an exemplary flow for creating a new version of an original stream of encoded video frames from a reduced stream of encoded video frames.

FIG. 14 illustrates an exemplary flow for creating a new version of an original stream of encoded video frames from a reduced stream of encoded video frames. The flow may be performed at a client, such as UE 610. At 1410, the client receives the reduced stream of encoded video frames. The reduced stream of encoded video frames may have been created by removing a plurality of frames from the original stream of encoded video frames at a server, such as the application server 170. At 1420, the client identifies the plurality of removed frames based on metadata related to the reduced stream of encoded video frames. At 1430, the client generates a plurality of replacement frames based on the identified plurality of removed frames. At 1440, the client adds the plurality of replacement frames to the reduced stream of encoded video frames to recreate the new version of the original stream of encoded video frames. At 1450, the client plays the new version of the original video stream.

While the aspects above have been described primarily with reference to 1×EV-DO architecture in CDMA2000 networks, GPRS architecture in W-CDMA or UMTS networks and/or EPS architecture in LTE-based networks, it will be appreciated that other aspects can be directed to other types of network architectures and/or protocols.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of creating a new version of an original stream of encoded video frames from a reduced stream of encoded video frames, comprising:
   receiving the reduced stream of encoded video frames, wherein the reduced stream of encoded video frames comprises a sequence of a first intra-coded (I) frame, a second I frame, and a third I frame, and wherein the reduced stream of encoded video frames was created by removing, from the original stream of encoded video frames, all predicted (P) frames of a plurality of P frames between the first I frame and the third I frame other than at least one P frame of the plurality of P frames converted to the second I frame;
   identifying the plurality of removed frames based on metadata related to the reduced stream of encoded video frames;
   generating a plurality of replacement frames based on the identified plurality of removed frames, wherein the generating comprises morphing the first I frame of the reduced stream of encoded video frames into the second I frame of the reduced stream of encoded video frames and morphing the second I frame of the reduced stream of encoded video frames into the third I frame of the reduced stream of encoded video frames to generate the plurality of replacement frames, wherein the plurality of replacement frames correspond to all P frames of the plurality of P frames between the first I frame and the third I frame other than the at least one P frame of the plurality of P frames converted to the second I frame; and
   adding the plurality of replacement frames to the reduced stream of encoded video frames to recreate the new version of the original stream of encoded video frames.

2. The method of claim 1, further comprising:
   processing the metadata related to the reduced stream of encoded video frames.

3. The method of claim 1, wherein the metadata is included in headers of the reduced stream of encoded video frames.

4. The method of claim 1, wherein the identifying comprises:
   determining that the first I frame is a beginning of a sequence of dropped frames; and
   storing the first I frame as the beginning of the sequence of dropped frames.

5. The method of claim 4, wherein the identifying further comprises:
   determining that the second I frame is a first frame after the sequence of dropped frames; and
   storing the second I frame as an end of the sequence of dropped frames.

6. The method of claim 5, wherein the generating comprises:

recreating the sequence of dropped frames based on the first I frame stored as the beginning of the sequence of dropped frames and the second I frame stored as the end of the sequence of dropped frames.

7. The method of claim 6, wherein the recreating comprises:
using motion tracking to identify one or more objects in the first I frame and the second I frame; and
generating the plurality of replacement frames based on moving the one or more objects from their positions in the first I frame to their positions in the second I frame.

8. The method of claim 5, wherein the determining that the second I frame is the first frame after the sequence of dropped frames is based on the metadata.

9. The method of claim 4, wherein the determining that the first I frame is the beginning of the sequence of dropped frames is based on the metadata.

10. The method of claim 1, further comprising:
playing the new version of the original stream of encoded video frames.

11. An apparatus for creating a new version of an original stream of encoded video frames from a reduced stream of encoded video frames, comprising:
at least one receiver configured to receive the reduced stream of encoded video frames, wherein the reduced stream of encoded video frames comprises a sequence of a first intra-coded (I) frame, a second I frame, and a third I frame, and wherein the reduced stream of encoded video frames was created by removal, from the original stream of encoded video frames, all predicted (P) frames of a plurality of P frames between the first I frame and the third I frame other than at least one P frame of the plurality of P frames converted to the second I frame; and
at least one processor configured to:
identify the plurality of removed frames based on metadata related to the reduced stream of encoded video frames;
generate a plurality of replacement frames based on the identified plurality of removed frames, wherein the at least one processor being configured to generate the plurality of replacement frames comprises the at least one processor being configured to morph the first I frame of the reduced stream of encoded video frames into the second I frame of the reduced stream of encoded video frames and to morph the second I frame of the reduced stream of encoded video frames into the third I frame of the reduced stream of encoded video frames to generate the plurality of replacement frames, wherein the plurality of replacement frames correspond to all P frames of the plurality of P frames between the first I frame and the third I frame other than the at least one P frame of the plurality of P frames converted to the second I frame; and
add the plurality of replacement frames to the reduced stream of encoded video frames to recreate the new version of the original stream of encoded video frames.

12. The apparatus of claim 11, wherein the metadata is included in headers of the reduced stream of encoded video frames.

13. The apparatus of claim 11, wherein the at least one processor being configured to identify comprises the at least one processor being configured to:
determine that the first I frame is a beginning of a sequence of dropped frames; and
store the first I frame as the beginning of the sequence of dropped frames.

14. The apparatus of claim 13, wherein the at least one processor being configured to identify comprises the at least one processor being configured to:
determine that the second I frame is a first frame after the sequence of dropped frames; and
store the second I frame as an end of the sequence of dropped frames.

15. The apparatus of claim 14, wherein the at least one processor being configured to generate comprises the at least one processor being configured to:
recreate the sequence of dropped frames based on the frame stored as the beginning of the sequence of dropped frames and the frame stored as the end of the sequence of dropped frames.

16. The apparatus of claim 11, wherein the at least one processor is further configured to play the new version of the original stream of encoded video frames.

17. An apparatus for creating a new version of an original stream of encoded video frames from a reduced stream of encoded video frames, comprising:
means for receiving the reduced stream of encoded video frames, wherein the reduced stream of encoded video frames comprises a sequence of a first intra-coded (I) frame, a second I frame, and a third I frame, and wherein the reduced stream of encoded video frames was created by removal, from the original stream of encoded video frames, all predicted (P) frames of a plurality of P frames between the first I frame and the third I frame other than at least one P frame of the plurality of P frames converted to the second I frame;
means for identifying the plurality of removed frames based on metadata related to the reduced stream of encoded video frames;
means for generating a plurality of replacement frames based on the identified plurality of removed frames, wherein the means for generating comprises means for morphing the first I frame of the reduced stream of encoded video frames into the second I frame of the reduced stream of encoded video frames and for morphing the second I frame of the reduced stream of encoded video frames into the third I frame of the reduced stream of encoded video frames to generate the plurality of replacement frames, wherein the plurality of replacement frames correspond to all P frames of the plurality of P frames between the first I frame and the third I frame other than the at least one P frame of the plurality of P frames converted to the second I frame; and
means for adding the plurality of replacement frames to the reduced stream of encoded video frames to recreate the new version of the original stream of encoded video frames.

18. The apparatus of claim 17, wherein the metadata is included in headers of the reduced stream of encoded video frames.

19. The apparatus of claim 17, wherein the means for identifying comprises:
means for determining that the first I frame is a beginning of a sequence of dropped frames; and
means for storing the first I frame as the beginning of the sequence of dropped frames.

20. The apparatus of claim 19, wherein the means for identifying further comprises:
means for determining that the second I frame is a first frame after the sequence of dropped frames; and means for storing the second I frame as an end of the sequence of dropped frames.

21. The apparatus of claim 20, wherein the means for generating comprises:
means for recreating the sequence of dropped frames based on the frame stored as the beginning of the sequence of dropped frames and the frame stored as the end of the sequence of dropped frames.

22. The apparatus of claim 17, further comprising:
means for playing the new version of the original stream of encoded video frames.

23. An non-transitory computer-readable medium for creating a new version of an original stream of encoded video frames from a reduced stream of encoded video frames, comprising:
at least one instruction to receive the reduced stream of encoded video frames, wherein the reduced stream of encoded video frames comprises a sequence of a first intra-coded (I) frame, a second I frame, and a third I frame, and wherein the reduced stream of encoded video frames was created by removal, from the original stream of encoded video frames, all predicted (P) frames of a plurality of P frames between the first I frame and the third I frame other than at least one P frame of the plurality of P frames converted to the second I frame;
at least one instruction to identify the plurality of removed frames based on metadata related to the reduced stream of encoded video frames;
at least one instruction to generate a plurality of replacement frames based on the identified plurality of removed frames, wherein the at least one instruction to generate comprises at least one instruction to morph the first I frame of the reduced stream of encoded video frames into the second I frame of the reduced stream of encoded video frames and to morph the second I frame of the reduced stream of encoded video frames into the third I frame of the reduced stream of encoded video frames to generate the plurality of replacement frames, wherein the plurality of replacement frames correspond to all P frames of the plurality of P frames between the first I frame and the third I frame other than the at least one P frame of the plurality of P frames converted to the second I frame; and
at least one instruction to add the plurality of replacement frames to the reduced stream of encoded video frames to recreate the new version of the original stream of encoded video frames.

24. The non-transitory computer-readable medium of claim 23, wherein the metadata is included in headers of the reduced stream of encoded video frames.

25. The non-transitory computer-readable medium of claim 23, wherein the at least one instruction to identify comprises:
at least one instruction to determine that the first I frame is a beginning of a sequence of dropped frames; and
at least one instruction to store the first I frame as the beginning of the sequence of dropped frames.

26. The non-transitory computer-readable medium of claim 25, wherein the at least one instruction to identify further comprises:
at least one instruction to determine that the second I frame is a first frame after the sequence of dropped frames; and
at least one instruction to store the second I frame as an end of the sequence of dropped frames.

27. The non-transitory computer-readable medium of claim 26, wherein the at least one instruction to generate comprises:
at least one instruction to recreate the sequence of dropped frames based on the frame stored as the beginning of the sequence of dropped frames and the frame stored as the end of the sequence of dropped frames.

28. The non-transitory computer-readable medium of claim 23, further comprising:
at least one instruction to play the new version of the original stream of encoded video frames.

* * * * *